United States Patent [19]

Mailer

[11] 3,837,423
[45] Sept. 24, 1974

[54] ACOUSTIC EXCITED LIQUID CRYSTAL IMAGE DETECTOR SYSTEM
[75] Inventor: Hugh Mailer, Columbus, Ohio
[73] Assignee: The Ohio State University Research Foundation, Columbus, Ohio
[22] Filed: Oct. 29, 1970
[21] Appl. No.: 85,159

[52] U.S. Cl. ........ 181/5 AP, 340/5 MP, 350/161 LC
[51] Int. Cl. .......................... G02f 1/34, G01n 21/00
[58] Field of Search ....... 181/5 AP; 340/5 MP, 5 H; 350/161 LC

[56] References Cited
UNITED STATES PATENTS

| | | | |
|---|---|---|---|
| 2,525,873 | 10/1950 | DeLano | 340/5 MP |
| 2,855,531 | 10/1958 | Nicoll | 340/5 MP |
| 2,957,340 | 10/1960 | Rocha | 340/5 MP |
| 3,431,462 | 3/1969 | Muenow | 340/5 MP |

OTHER PUBLICATIONS
Ultrasonic Stimulation of Optical Scattering in Nematic Liquid Crystals, Kessler, Applied Physics Letters, Nov. 15, 1970, p. 440–441.
"A Liquid Crystal Film Used for Mapping an Acoustic Field" K. Iizuka, Proceedings of the IEEE, Vol. 58, No. 2, p. 288.
Heilmeir, G. Dynamic Scattering: A New Electrooptic Effect in Certain Classes of Nematic Liquid crystals, Proceedings of the IEEE, Vol. 56, No. 7, July 1968, pp. 1162–1171.

Primary Examiner—Benjamin A. Borchelt
Assistant Examiner—J. V. Doramus
Attorney, Agent, or Firm—Anthony D. Cenamo

[57] ABSTRACT

An image detector system for patterned acoustic energy is set forth based upon a liquid crystal cell including a sandwiched layer of nematic liquid crystal material. Sound transducing means at said cell transduce said acoustic energy into corresponding electric field variations across said crystal layer, to effect a light scattering pattern in accordance with the sound pattern.

7 Claims, 3 Drawing Figures

PATENTED SEP 24 1974                3,837,423

ACOUSTIC EXCITED LIQUID CRYSTAL IMAGE DETECTOR SYSTEM

BACKGROUND OF THE INVENTION

This invention relates generally to sonic and ultrasonic technology, and more specifically relates to apparatus and methodology for acoustic image detection.

In numerous applications of ultrasonic technology it is desirable to effectively visualize an ultrasonic image. Typically, for example, an ultrasonic wave front is passed through a test sample of metal or the like in an effort to discover flaws or imperfections in the said material. The ensuing sonic pattern is then examined much in the nature of an x-ray. In analogy to the x-ray procedure great simplification of procedures is enabled by visualizing the resulting sonic pattern and examining the said visualization to detect irregularities, patterns of strain or so forth.

In the past, many techniques have been developed to visualize ultrasonic images. These utilize a variety of ultrasonically produced phenomena including electrical, mechanical, thermal, photographic and chemical effects. In operation, the ultrasound image detector usually carries out a transducing action, e.g., converting mechanical energy into thermal or electrical energy, or utilizes mechanical energy directly to alter its light transmission or reflection characteristics in such a manner that a visible image is formed. Typically, electrical and thermal energy must undergo a second transduction stage, the end product of which is visible image. As an example of the latter, thermal energy may be utilized to initiate chemical reactions or change the fluorescent of phosphorescent properties of a material.

Among the better known of the electronic techniques for yielding ultrasonic images is the technique utilizing the so-called "ultrasound image converter tube." The device specified is directly analogous to a television camera with the photo-electric cathode being replaced by a piezoelectric plate. The imaging results yielded by use of such devices are in many instances impressive; however, the system is electrically quite complex, necessitates use of sophisticated electron beam scanning circuits and so forth.

A quite different technique for ultrasound image detection utilizes the so-called "Pohlman cell" wherein small flakelets of aluminum are suspended in a solution of xylene. One face of the cell is acoustically transparent and at least one face is optically transparent. In the absence of ultrasound illumination, the aluminum flakes are randomly oriented as a consequence of the thermal motion of the xylene molecules. In this condition, an observer looking into the cell will see a uniform matte surface. However, when an ultrasound beam is projected into the cell, the aluminum flakes will orient themselves in particular attitudes to the sound field. The resulting variations in specular reflection corresponds to the particle-velocity distribution in the ultrasound image, thus making the image visible.

Among the principal advantages of the above-described Pohlman cell are its simplicity, relatively good resolving power and theoretically high contrast range. The resolution is limited, however, by the size of the aluminum flakes. Moreover the sensitivity of the cell is considered to be low in comparison to that of the ultrasound image converter tube. Apart from the low sensitivity, the gradual settling of the flakes and the considerable time taken to establish the image are considered to be the main disadvantages of this techniques. The time taken to establish the image can vary from several seconds to minutes depending on the intensity of the sound field.

OBJECTS OF THE INVENTION

In accordance with the foregoing, it may be regarded as an object of the present invention to provide ultrasonic imaging apparatus which is of simple design and functions without a requirement for complex electron beam scanning circuitry and/or evacuated envelopes.

It is another object of the present invention to provide apparatus for visualizing sound patterns, which is simple in design and operation, and which nevertheless provides high sensitivity to incident acoustic images.

It is a yet further object of the invention to provide ultrasonic imaging apparatus which provides an excellent graduated response to acoustic intensities varying over a wide range, thereby effecting good contrast ranges in the resultant images.

It is a further object of the invention to provide ultrasonic imaging apparatus of very high image resolving characteristics.

It is still further object of the invention to provide ultrasonic imaging apparatus having both low threshold sensity to an incident sound pattern and rapid time of image formation.

Now in accordance with the present invention, the foregoing objects, and others as will become apparent in the course of the ensuing specification, are achieved in a sonic image detection system based upon use of a liquid crystal cell including a sandwiched layer of nematic liquid crystal material. Sound transducing means at the cell transduce incident acoustic energy into corresponding electric field variations across the crystal layer to effect a dynamic light scattering pattern therein in accordance with the sound pattern. The said transducing means comprises in one embodiment a piezoelectric plate for effectively transforming the sound pattern into a charge image across the liquid crystal. In another embodiment of the invention the sandwiched liquid crystal layer is contained between electrically conductive plates, at least one of which is deformable. In the presence of an electrical potential between such plates the acoustic pattern is rendered incident to thereby deform the plate spacing and effect corresponding variations in the electric field between the plates. The resulting variations in light scattering properties of the liquid crystal layer are the observed as a function of acoustic image intensity.

The invention is diagrammatically illustrated, by way of example, in the drawings appended hereto, in which:

DESCRIPTION OF THE PREFERRED EMBODIMENTS

In accordance with the present invention a thin layer of nematic crystal material is selectively subjected to an electric field, which field by virtue of the structure utilized is conformed to an acoustic intensity pattern desired to be imaged. Under the influence of the said electric field, the nematic crystal effectively changes from its essentially transparent quiescent state, and more specifically developes scattering centers in accordance with the said field intensity. This so-called "dynamic scattering mode" exhibited by nematic liquid crystals is discussed in much detail in an article by Heilmeir, Zanoni, & Barton, "Dynamic Scattering: A New Electro-optic Effect in Certain Classes of Nematic Liquid Crystals" Proceedings of the IEEE, Vol. 56, No. 7, July 1968, and reference may usefully be had to that article for further discussion of the phenomena. The said article is also useful in setting forth a number of materials which yield high performance in the dynamic scattering mode of operation. Many of these materials are members of a class of organic compounds known as Schiff bases. These materials, when highly pure, are essentially transparent in the visible and have resistivities of 1 to $5 \times 10^{10}$ ohm-cm and a dielectric constant of 3.5° at 90°C. the compound APAPA (anisylidene para-amino-phenylacetate) is particularly noteworthy in its ability to perform in the dynamic scattering mode.

Figure 1:
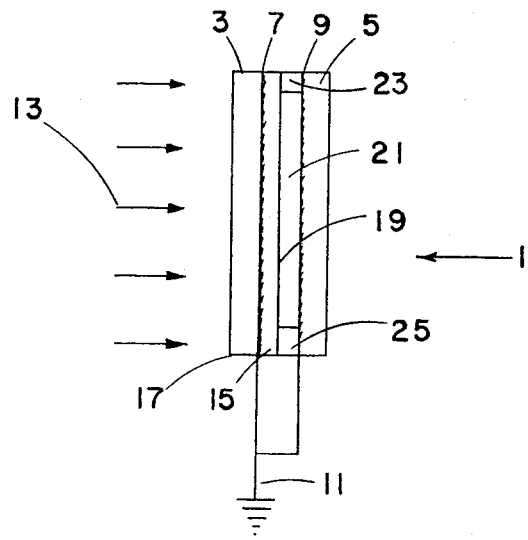
FIG. 1 illustrates in schematic fashion a cross-sectional view through one embodiment of a liquid crystal cell utilizable in the present invention.

In FIG. 1 a schematic cross sectional view is shown through a first embodiment of a liquid crystal cell utilizable in the present invention. The cell 1 shown therein includes a pair of glass plates of the so-called NESA type — i.e., glass coated with a transparent electrically conductive material (coatings 7 and 9) of tin oxide or the like. In the cell 1 the electroded portions of plates 3 represented by coatings 7 and 9 are commonly grained. Patterned acoustic energy as suggested by the arrows at 13 is rendered incident upon cell 1, through plate 3. Typically, such incident energy is at ultrasonic frequencies and may, for example, result from passage of a uniform wavefront through a test object interposed between a sound source and the cell 1.

Positioned agaisnt the plate 7 and contiguous with the conductive coating 7 is a piezoelectric plate 15. The plate 15 preferably is itself provided with a conductive coating at its face 17 adjacent plate 7. The opposite face 19 of piezoelectric plate 15 is, in turn, in contact with the liquid crystal layer 21. As has been when a plate of piezoelectric material such as plate 15 is loaded by having one or both of its faces in contact with a liquid, its resonant motion is highly damped and it is found that the plate will respond point-by-point over its surface to an incident ultrasonic wave and not as a single unit. If both faces were to be coated with an electrically conducting material, then an electrical signal taken from one of the faces would correspond to the integral effect of all the elemental points making up this face. In the present environment, however, where it is desired to convert the incident ultrasonic image 13 into a spatially-equivalent electric charge at face 19, only the face 17 is provided with a conductive coating. Piezoelectric plate 15 may comprise various materials known in the art, as for example a thin rectangular plate of lead zirconate — lead titanate, x-cut quartz, or a suitably formed plate of barium titanate. Similarly, plate 15 may comprise a mosaic structure formed of a plurality of separate piezoelectric elements, providing the mosaic preserves the desired resolving properties in the cell 1.

The nematic crystal layer 21 is sandwiched between plates 3 and 5 which typically will be separated by spacers 23, 25 or the like. The latter may typically comprise mylar or teflon films in thickness range of about 0.0005 to 0.002 inches. Capillary action is generally sufficient to hold the liquid between the plates, but edge sealing of the cell is preferred. Suitable spacing of plates 3 and 5 may also be effected by incorporating into the nematic crystal a small quantity of an inert nonconductive powder of appropriate particle size. The maximum size of the powder particles should approximate the desired spacing and the powder — typically a powdered plastic resin — is chosen to have high dielectric strength and to not be chemically contaminative to the nematic crystal.

In the embodiment of FIG. 1, the cell 1 is preferably viewed from the side thereof facing plate 3. In accordance with this scheme of operation. plate 3 is completely transparent and piezoelectric plate 15 is sufficiently thin to also be transparent; however, plate 5 is a specularly reflecting plate which is faced into a black background — that is to say that plate 5 is opaque. In the quiescent state for the crystal 21, with no field applied, the liquid crystal is essentially transparent, and in consequence the cell when viewed through plate 3 appears black. In the activated diffuse state, however, the nematic liquid crystal 21 becomes a light scatterer, reflecting ambient light back to the eye. The diffuse reflectance is nearly lambertian, and the brightness is therefore a direct function of ambient light. The present apparatus is therefore capable of displaying images under condition of very high ambient light. This is an important consideration in the present device. Furthermore, if we consider the operation of cell 1 we note that the incident ultrasonic pattern 13 is transduced by piezoelectric plate 15 into a varying charge pattern at face 19 adjacent the liquid crystal 21, the resultant variation in electric field across the cyrstal then effecting the discussed scattering pattern. It is noted, however, that the electroded surfaces of the plates 3 and 5 are tied to ground, and hence no input power is provided to the display device except by the sonic input itself.

The FIG. 1 embodiment of the cell utilized in the present invention, is as has been discussed, based upon a viewing mode predicted on reflection. It will, of course, also be evident that the cell can be constructed so as to be observable in transmitted light. In this case both electroded plates in the cell are transparent. With no field applied, light is transmitted by such a cell. In the excited state, however, the liquid crystal scatters incident light, thereby selectively reducing the amount of transmitted light.

Figure 2:
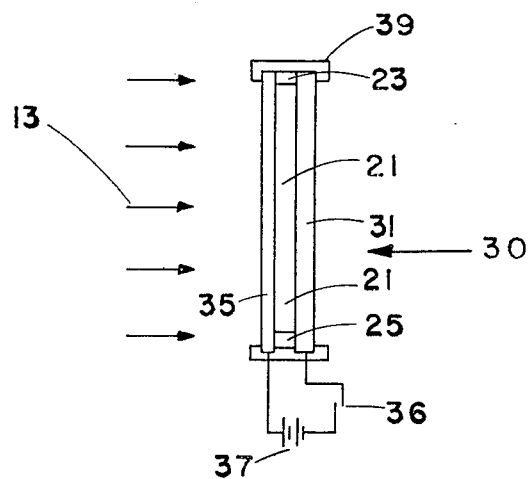
FIG. 2 illustrates in schematic fashion a cross-sectional view through a second embodiment of a liquid crystal cell utilizable in the invention.

FIG. 2 depicts, in schematic fashion, a second embodiment of a cell utilizable in accordance with the invention. The cell 31 shown therein includes a backing electrode 30 of NESA glass or the like, the electroded face 33 of which is in contact with a liquid crystal layer 21 (corresponding elements in FIG. 2 are identified with reference numerals corresponding to those of FIG. 1). The electroded plate 3 and piezoelectric plate 15 of FIG. 1, however, have now been replaced with a deformable conductive electrode 35. The latter which may typically comprise a thin membrane of conductive rubber is seen to be connected via a switch 36 to one side of an electrical potential source 37, the other side of which is connected to electroded face 33 of plate 31. With the switch 36 closed, an electric field is thereby established across crystal 21, and as the electrode 35 and plate 31 are uniformly spaced by a frame 38, the field in the absence of incident sound will be uniform. Under such conditions viewing the cell 30 from the right side (in the sense of the figure) uniform diffuse reflection of intensity may be observed in accordance with the applied potential and the ambient light levels. An incident sonic energy pattern 13, however, deforms the membrane comprising electrode 35 in accordance with the sound pattern, to thereby effect localized variations in the spacing of the cell and consequent variations in the electric field across the liquid crystal layer 21. Resultant variations in scattering are then observable from the right side of the cell (electrode 35 being opaque to light) essentially in the manner set forth in connection with the description of FIG. 1.

In connection with the viewing modes set forth in both the FIG. 1 and FIG. 2 descriptions, it may be pointed out that if the amount of light scattered is relatively small proportion of the incident light, Schlierin optics techniques may be utilized to enhance the scattered light. As is well known in the optics art this can be achieved by focusing the light reflected from, or transmitted through the liquid crystal cell onto an opaque aperture. The aperture can then be adjusted to permit the light scattered within the liquid crystal to be the major portion of the light which proceeds beyond the aperture.

Figure 3:
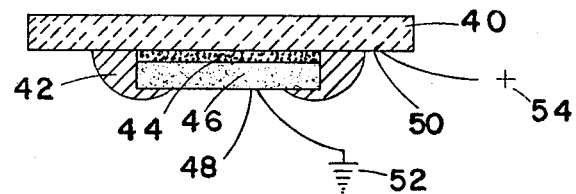
FIG. 3 is a cross sectional view of an actual constructed embodiment of the present invention.

With reference to FIG. 3 tere is shown an actual constructed embodiment of the present invention. An x-cut quartz crystal 46 is the baseplate for the liquid crystal 44. A gold plating 48 on the underside of the baseplate 46 is the grounding electrode connected at ground 52. A transparent conducting coating 50 was applied to the underside of the glass plate 40 enclosing the cell. An E-field is applied to the cell at positive source 54. The over-all cell was sealed at 42.

While the present invention has been particularly described in terms of specific embodiments thereof, it will be apparent to those skilled in the art that numerous modifications are possible without departing from the spirit of the invention and the scope of the subjoined claims.

What is claimed is:

1. An acoustic image detector system, comprising: a liquid crystal cell including a pair of spaced plates and a nematic liquid crystal layer contained therebetween, one of said plates being transparent to incident light; and the other of said plates comprises a piezoelectric plate serving as a sound transducing means at said cell adapted to receive a pattern of sound energy and transduce said pattern into corresponding electric field variations across said crystal layer, the resulting variations in light scattering properties of said layer effecting viewable scattering of said incident light in accordance with said sound energy pattern.

2. Apparatus in accordance with claim 1 wherein one of said plates is transparent to said incident light and the other of said plates presents a light absorptive surface to said crystal layer, whereby when said cell is viewed from the side of said transparent plate nonscattering portions of said layer appear darkened.

3. Apparatus in accordance with claim 1 wherein both of said plates are transparent, said scattering being viewed as variations in transmitted light.

4. Apparatus in accordance with claim 1 wherein said plates are electrically conductive and connected to a source of electrical potential, at least one of said plates being deformable in response to said patterned sound energy, whereby spacing variations and electric field variations occur in accordance with said sound pattern to effect corresponding variations in said light scattering.

5. Apparatus in accordance with claim 4 wherein said source of potential is a dc source.

6. Apparatus in accordance with claim 5 wherein said deformable plate comprises a flexible membrane.

7. Apparatus in accordance with claim 5 wherein said deformable plate is opaque to incident light, said cell being viewed through the remaining transparent plate.

* * * * *